United States Patent [19]
Moss et al.

[11] Patent Number: 5,278,008
[45] Date of Patent: Jan. 11, 1994

[54] DIFFRACTION EFFICIENCY CONTROL IN HOLOGRAPHIC ELEMENTS

[75] Inventors: Gaylord E. Moss, Marina del Rey; Kevin Yu, Temple City; John E. Wreede, Monrovia, all of Calif.

[73] Assignee: Hughes Aircraft Company, Los Angeles, Calif.

[21] Appl. No.: 973,194

[22] Filed: Nov. 6, 1992

Related U.S. Application Data

[63] Continuation of Ser. No. 606,687, Oct. 31, 1990, abandoned.

[51] Int. Cl.$^5$ .............................................. G03H 1/04
[52] U.S. Cl. .......................................... 430/1; 430/2; 430/323; 359/9; 359/12
[58] Field of Search .................... 359/8, 9, 12–14; 430/1, 2, 312–323

[56] References Cited

U.S. PATENT DOCUMENTS

| | | | |
|---|---|---|---|
| 3,892,571 | 7/1975 | Simeonov et al. | 430/5 |
| 3,960,560 | 6/1976 | Sato | 430/5 |
| 4,088,490 | 5/1978 | Duke et al. | 430/312 |
| 4,677,285 | 6/1987 | Taniguchi | 430/1 |
| 4,818,045 | 4/1989 | Chang | 359/618 |
| 4,906,552 | 3/1990 | Ngo et al. | 430/394 |
| 4,988,151 | 1/1991 | Moss | 359/30 |

FOREIGN PATENT DOCUMENTS

| | | | |
|---|---|---|---|
| 58-200275 | 11/1983 | Japan | 430/2 |
| 1111129 | 8/1984 | U.S.S.R. | 430/2 |
| 1275354 | 12/1986 | U.S.S.R. | 430/1 |

Primary Examiner—Charles L. Bowers, Jr.
Assistant Examiner—Martin Angelbranndt
Attorney, Agent, or Firm—L. A. Alkov; W. K. Denson-Low

[57] ABSTRACT

A method for precisely controlling the overall average diffraction efficiency of a hologram including the steps of (a) providing a hologram layer that includes a hologram formed pursuant to hologram forming exposure and development, (b) coating the hologram layer with a photoresist layer, (c) masking the photoresist layer with a mask having opaque and transparent areas wherein the proportion of the opaque areas relative to the transparent areas is selected pursuant to the desired diffraction efficiency, the opaque and transparent areas being sufficiently small so as to have little noticeable effect when the resulting hologram is played back, (d) exposing the photoresist layer to actinic illumination through the mask transparent areas, (e) developing the photoresist layer to remove the photoresist in the areas illuminated by the actinic illumination to uncover the areas of the recording material corresponding to the transparent areas of the mask, (f) etching the recording material to remove the areas thereof that were uncovered by etching of the photoresist, and (g) removing the remaining photoresist. The formation of the hologram can be at an effective exposure in the saturated region of the efficiency vs. exposure curve wherein changes in efficiency as a function of parameter variation are small.

4 Claims, 3 Drawing Sheets

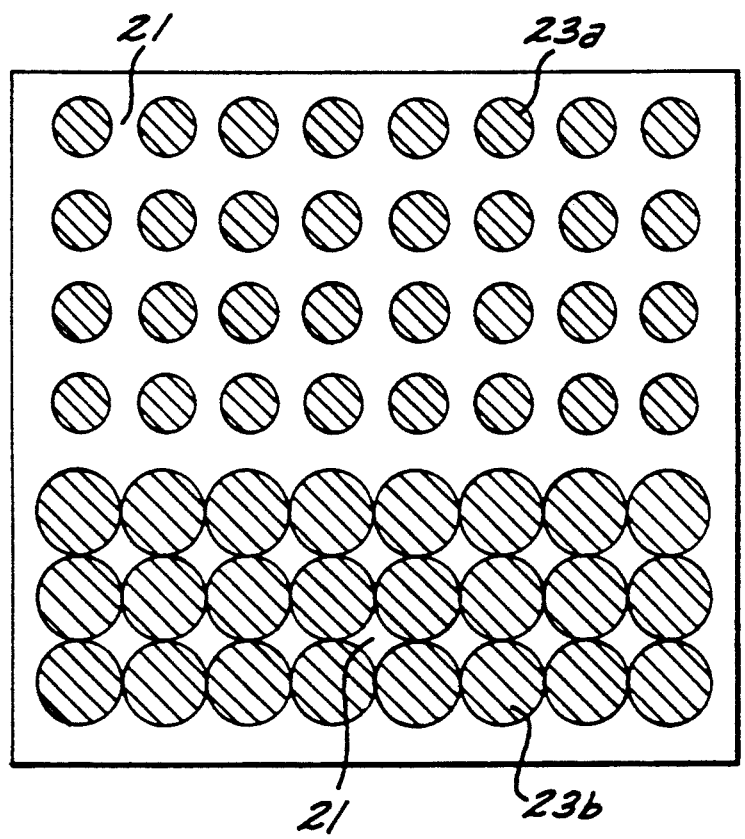

DIFFRACTION EFFICIENCY CONTROL IN HOLOGRAPHIC ELEMENTS

This is a continuation of application Ser. No. 07/606,687 filed Oct. 31, 1990, now abandoned.

BACKGROUND OF THE INVENTION

This present invention is directed generally to hologram fabricating techniques, and is directed more particularly to a technique for controlling effective diffraction efficiency in holograms.

In the manufacture of holograms such as those utilized for vehicle head-up display systems, it may be desirable to closely control hologram efficiency and bandwidth within narrow limits to meet the required optical performance. This is due to the interrelationships between parameters including diffraction efficiency, see-through and angular bandwidth.

However, reproducibility of holograms having the desired efficiency and bandwidth is difficult due to the extreme sensitivity of hologram performance to a variety of factors in the recording process. Some of these factors include:

1. Recording material: age, storage conditions, pre-exposure hardening, molecular composition and moisture content.
2. Chemical processing: temperature, time, agitation, chemical concentration and subsequent drying conditions.
3. Laser exposure: beam power, time, coherence length, beam ratio and mechanical stability.

With present techniques, it is difficult to precisely control all of these parameters, and manufacturing yield tends to be quite low.

Present techniques to meet tight diffraction efficiency requirements are directed to precisely controlling the hologram manufacturing parameters. However, such tight control is extremely difficult to achieve with some materials such as dichromated gelatin, wherein recording involves molecular crosslinking that is non-linearly affected by such parameters as the organic molecular structure of animal protein, temperature, moisture content, laser exposure energy, gelation rate during film coating, previous history of the gelatin molecules, rate of dehydration after wet processing, swelling of the gelatin during processing, and others.

Presently, the recording medium thickness is selected to provide the desired bandwidth, then all other fabrication parameters are selected and controlled to give the desired diffraction efficiency. In particular, a diffraction efficiency vs. effective exposure curve indicates the relationship of diffraction efficiency to effective exposure, wherein the effective exposure level includes all the variables in recording material, laser exposure and chemical processing. In view of the number of exposure variables and their non-linearity and sensitivity to many factors, attempting to control diffraction efficiency by tightly controlling exposure parameters is exceedingly difficult.

SUMMARY OF THE INVENTION

It would therefore be an advantage to provide a hologram diffraction control technique which provides for tight diffraction efficiency control accurately and reproducibly despite large variations and non-linearities in the holographic recording materials and processes.

The foregoing and other advantages are provided by the invention in a method for controlling hologram diffraction efficiency that includes the steps of (a) providing a hologram layer that includes a hologram formed with an effective hologram forming exposure that yields a high hologram efficiency, (b) coating the holographic recording medium with a layer of a photoactive polymer such as photoresist, (c) applying to the photoactive polymer layer a mask having opaque and transparent areas wherein the proportion of the opaque areas relative to the transparent areas is selected pursuant to the desired diffraction efficiency, the opaque and transparent areas being sufficiently small so as to have little noticeable effect when the resulting hologram is played back, (d) exposing the photoactive polymer layer to actinic radiation whereby only the polymer layer areas in registration with the transparent areas in the mask are exposed to the actinic radiation, (e) removing the mask, (f) developing the photoactive polymer layer to remove the areas of the photoactive polymer layer that were exposed to the actinic radiation, (g) etching the hologram recording medium to remove the areas thereof that were beneath the removed photoactive polymer layer areas, whereby the removed recording material areas correspond to the transparent areas in the mask, and (i) removing the photoactive polymer layer. The hologram can be formed pursuant to exposure in the saturated region of the efficiency vs. exposure curve wherein changes in efficiency as a function of parameter variation are small, and the effective average overall diffraction efficiency can be at a selected lower level.

BRIEF DESCRIPTION OF THE DRAWING

The advantages and features of the disclosed invention will readily be appreciated by persons skilled in the art from the following detailed description when read in conjunction with the drawing wherein:

FIG. 3 is a schematic sectional view illustrating the photoresist and hologram recording material after etching of the hologram recording material.

FIG. 4 schematically illustrates a mask pattern that can be utilized with the etching arrangement shown in FIG. 1.

DETAILED DESCRIPTION OF THE DISCLOSURE

Figure 1:
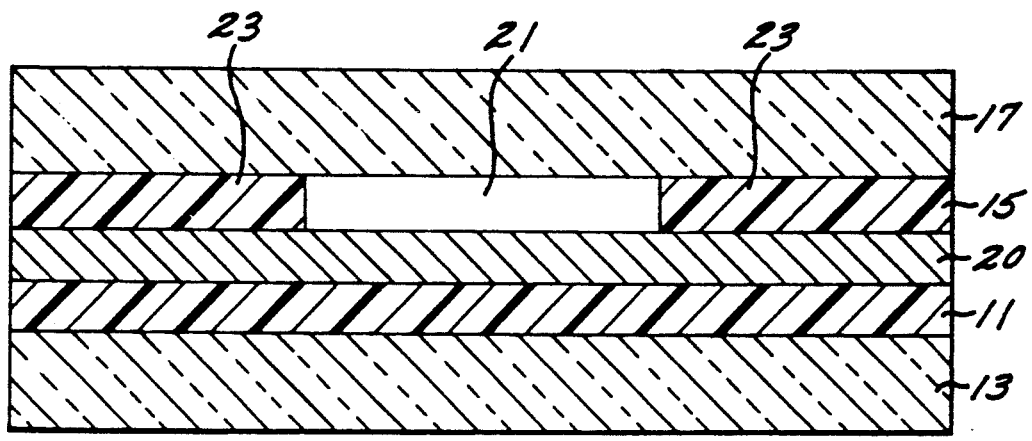
FIG. 1 is a schematic sectional view illustrating an etching arrangement in accordance with the invention for selectively removing areas of a hologram recording medium to control the average overall diffraction efficiency of the hologram.

In the following detailed description and in the several figures of the drawing, like elements are identified with like reference numerals.

Referring now to FIG. 1, shown therein is a masking arrangement in accordance with the invention for exposing a positive photoresist layer disposed on a hologram layer having a hologram formed therein so as to enable removal of selected areas of the hologram layer. A hologram 11 supported by a substrate 13 contains a hologram that has been formed pursuant to hologram forming exposure and development so as to yield a high hologram efficiency. A positive photoresist layer 20 is coated on the recording medium 11, and a contact mask 15, which is supported by a transparent mask substrate 17, is disposed on the positive photoresist layer 20.

The mask 15 includes a plurality of opaque areas 23 separated by transparent areas 21. The transparent areas 21 may be filled with refractive index matching fluid or transparent volumes of the same material as the mask substrate 17. The opaque and transparent areas of the mask 15 are sufficiently small such that they cannot be individually readily resolved by the human eye at the distance from which the hologram is to be viewed.

Figure 2:
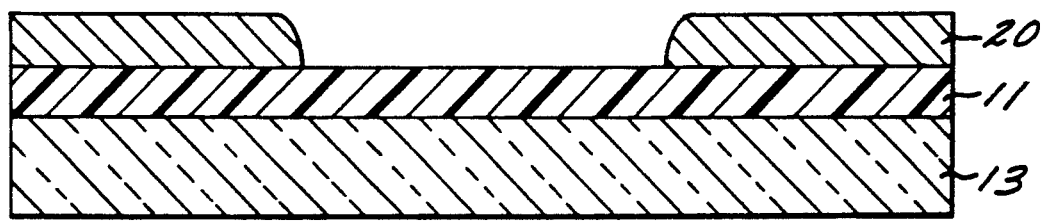
FIG. 2 is a schematic sectional view illustrating the photoresist and hologram recording material structure after development of the exposed photoresist.

With the arrangement of FIG. 1, non-coherent actinic illumination is directed through the mask 15 to the photoresist layer 20. As a result of the mask, only the areas of the photoresist layer 20 in registration with the transparent mask areas are exposed to the incident non-coherent actinic illumination. The photoresist layer 20 is then developed to remove the areas thereof that were exposed, resulting in a structure as schematically depicted in FIG. 2.

After development of the photoresist layer 20, the hologram layer areas uncovered or opened by removal of the photoresist (i.e., the hologram layer areas in registration with the mask transparent areas) are etched pursuant to wet or dry etching techniques, for example, resulting in a structure as schematically depicted in FIG. 3.

Depending upon the photoresist materials, the hologram recording material, and the photoresist developing chemicals, the same chemicals can be utilized to develop the photoresist and to etch the hologram layer areas in registration with the exposed photoresist layer areas. However, some further etching may be required to complete the etching of the hologram layer.

After the selected areas of the hologram layer 11 as defined by the transparent areas of the mask are removed by etching, the remaining areas of the hologram layer comprise hologram containing areas which together have a net overall average diffraction efficiency that is selected by controlling the proportion or percentage of the hologram containing areas (i.e., the areas protected by non-exposed photoresist areas as defined by the opaque areas of the mask), relative to the total area of use. Stated another way, net overall diffraction efficiency is selected by controlling the ratio of the opaque and transparent mask areas 23, 21. For example, for a hologram that can be consistently produced for 90% efficiency in the hologram containing areas, an overall diffraction efficiency requirement of 45% would call for hologram containing areas of only 50% of the area of interest. In other words, the opaque areas of the mask would comprise 50% of the total area of use.

Depending upon the application, the proportion of opaque areas can be fixed or constant over the entire area of use, or it can vary with position so as to provide for diffraction efficiency that varies as a function of position on the area of use.

By way of illustrative example and with reference to FIG. 4, the mask 15 comprises a pattern of opaque dots 23a, 23b with dot spacing sufficiently small to be unresolvable by the viewer. As particularly shown in FIG. 2, the variation of diffraction efficiency as a function of position on the hologram is readily achieved in the design of the exposure mask pattern that sets the dot pattern size. The centers of the opaque dots 23a, 23b are generally equally spaced and therefore the hologram area corresponding to the mask area having the smaller opaque dots 23a would have less diffraction efficiency and better see-through that the hologram area corresponding to the mask area have the larger opaque dots 23b.

Position variable diffraction efficiency can be utilized for different playback considerations including, for example, compensating non-uniformities in the playback optical system so as to provide for uniformity in the final playback image, or for varying the relative brightness of portions of the hologram to compensate for different backgrounds against which different portions of the hologram will be viewed. For example, lenses that may be utilized in playback have a natural fall-off with distance from the optical center, and such fall-off can be compensated by increasing diffraction efficiency with distance from the region of the hologram layer that corresponds to the optical center of the playback lenses. As a further example, in an automotive head-up display, part of the hologram image is viewed against the ambient scene while part of the image is viewed against the hood of the vehicle, and such variation in background can be compensated by providing for increased diffraction efficiency in those areas that will be viewed against brighter backgrounds.

While FIG. 4 illustrates circular opaque areas, it should be appreciated that other patterns such as square, rectangles, and other polygons could be used. Linear shapes could also be utilized. As a further alternative, the transparent areas can comprise the pattern of dots, squares, rectangles, and so forth. While the size of the patterns will vary with the application, the appropriate size (therefore spacing) can be determined from the fact that the resolution of the human eye is approximately 1 minute of arc. For an automotive head up display where the driver's eye is 36 inches from the windshield, the spacing between dots should be about 0.01 inches or less with the dot size determined by duty cycle or percentage of transparent area desired.

While the foregoing has been generally directed to the use of positive photoresist, it should be appreciated that negative photoresist can be utilized. With negative photoresist, the photoresist areas not exposed to actinic illumination would be removed by development, and therefore the selected hologram areas to be removed would be defined by the transparent areas of the mask. For example, if the mask pattern of FIG. 4 were to be utilized with negative photoresist in a manner to remove the hologram areas in registration with the areas between the circular areas, the circular areas of the mask would be transparent and the remaining areas would be opaque.

The invention basically contemplates areas in a hologram structure that are selectively processed to have either (a) a consistently reproducible diffraction efficiency (defined by the mask opaque areas), or (b) zero diffraction efficiency (defined by the mask non-opaque areas).

Figure 5:
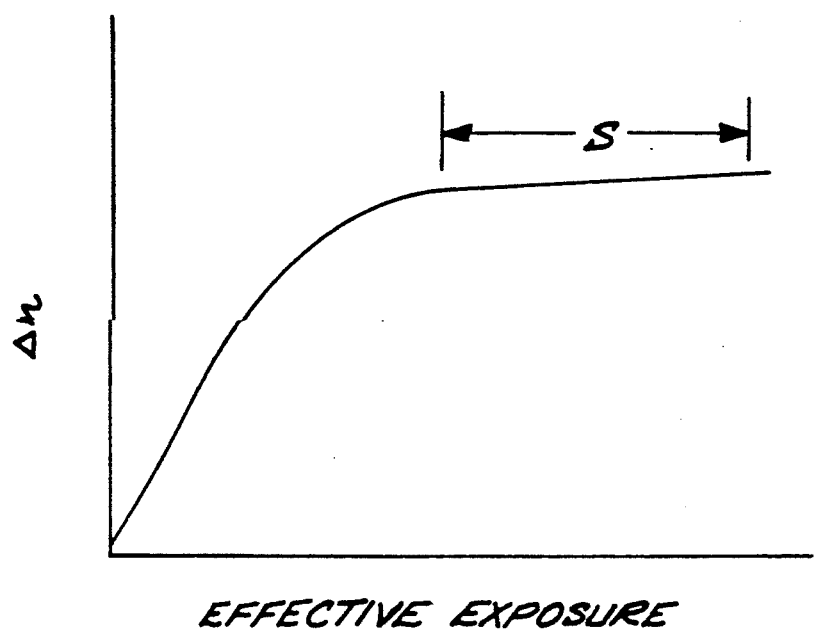
FIG. 5 is a typical index of diffraction vs. exposure curve for dichromated gelatin recording material.

Referring now to FIG. 5, shown therein is a response curve for dichromated gelatin hologram recording material showing index range (delta n) vs. effective exposure. Diffraction efficiency is directly related to the index range, and therefore the curve of FIG. 5 is indicative of diffraction efficiency. Effective exposure includes all variables in recording material, laser exposure, and chemical processing. In accordance with the invention, the hologram forming exposure can be made in the saturated region S of the response curve where variations in effective exposure have a very small effect on the index range delta n, and thus a very small effect on diffraction efficiency.

In this manner, localized diffraction efficiency in the hologram exposure is precisely controlled and can be consistently reproduced, and overall net diffraction efficiency is precisely controlled by the percentage or ratio of hologram containing areas as defined by opaque areas of the mask 15.

Figure 6:
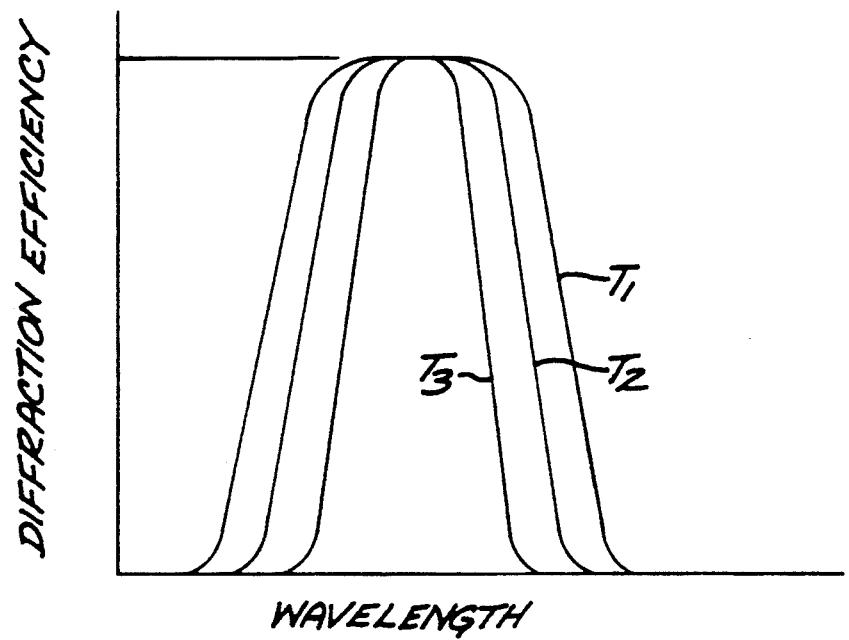
FIG. 6 sets forth diffraction efficiency vs. wavelength curves for dichromated gelatin hologram recording media of different thicknesses for effective exposure in the saturated region of the diffraction index vs. exposure curve of FIG. 5.

FIG. 6 is helpful in illustrating the consistency of overall diffraction efficiency achieved with the exposure technique of the invention, and schematically depicts the bandwidth curves for a plurality of thicknesses T1, T2, T3 of dichromated gelatin hologram recording material as exposed in the saturation region of the index range vs. effective exposure curve. For a reasonable range of thicknesses, the resulting maximum localized diffraction efficiencies of the hologram exposed areas are close to the same level D2. Thus, with the technique of the invention, the desired bandwidth is utilized to select the thickness of the recording medium, and the desired net overall efficiency is utilized to select the percentage of area of the recording material that is exposed to hologram forming exposure that is in the saturated region of the index/exposure response curve for that material.

It will be readily appreciated that the basic scheme of the invention can be implemented in a number of ways. For example, instead of subjecting the hologram layer to hologram forming exposure and development, an alternate procedure would be to first mask and etch away selected areas of the hologram recording medium, and then subjecting the etched hologram recording medium to hologram forming exposure and development. In this implementation, the mask is preferably coupled to the photoresist layer with an index matching fluid to prevent reflections from scattering into the unexposed hologram recording layer under the opaque areas of the mask. Such reflections would reduce the available index of refraction in the hologram layer for the holographic recording. For the same purpose, an appropriate coating is placed on the bottom of the substrate that supports the hologram recording layer. Such coating can be an absorptive coating to absorb light after it has passed through the hologram recording layer, or it can be an anti-reflection coating for coupling light after it has passed through the hologram recording medium. The anti-reflection coating need not be formed directly on the bottom of the hologram recording layer supporting substrate, but could be attached to an additional plate which is then index matched to the substrate.

In all of these methods, as well as numerous other possibilities, the essential feature of "full-on" or "full-off" diffraction efficiency is retained, which is important to obtaining reproducible macro diffraction efficiency.

It should also be appreciated that the photoresist layer 20 can be exposed in other ways such as with a dot or line scan pattern that is controlled by a computer driven positioner for moving either the beam spot or the substrate that includes the recording layer and the photoresist layer. Dot or line scan pattern exposure would be advantageous with recording materials configured in double curved shapes such as simple spherical or aspheric sections, as to which application of a photomask may be difficult. Dot or line scan pattern exposure would also be advantageously utilized for producing position variable diffraction efficiency which, as discussed above, can be utilized to compensate for various recording and playback considerations.

In addition to the foregoing illustrative examples that have been directed to exposing and processing the recording medium into the saturation region in which the holographic parameters change less with manufacturing variables, diffraction efficiency control in accordance with the invention is advantageously utilized in situations where the hologram is not formed by exposure and processing into the saturation region.

For example, a fixed exposure process that has been set to give a reproducible set of finished hologram parameters can be used for different hologram applications, wherein for each application the mask pattern would be varied so that the effective diffraction efficiency would be set as appropriate to work with the fixed exposure process to achieve the hologram parameters desired for that application. The use of a fixed exposure process for different applications would eliminate one of the main causes of low yield in prior methods, which is the need to change the exposure process for each application, with the nonlinearities in most recording materials causing difficult-to-predict results from each process change. In large scale manufacturing processes, diffraction efficiency control as disclosed would allow simpler and less expensive equipment to maintain an optimized standard process.

As a further example, the advantages of easily controlled spatial- variation of hologram efficiency over the surface of the hologram with a constant exposure over the entire hologram, as described previously, can be achieved with or without saturating the material. The use of a fixed process as described above for different hologram applications would apply to holograms having spatially varied efficiencies as well as to holograms having substantially spatially constant efficiencies.

From the foregoing, it can be seen that the hologram diffraction control technique of the invention provides for the tight control of overall net diffraction efficiency of holograms, and provides for the production of holograms having consistent and reproducible diffraction efficiencies.

Although the foregoing has been a description and illustration of specific embodiments of the invention, various modifications and changes thereto can be made by persons skilled in the art without departing from the scope and spirit of the invention as defined by the following claims.

What is claimed is:

1. A method for controlling the diffraction efficiency of a hologram layer having a predetermined area of use to achieve a predetermined net overall diffraction efficiency for the predetermined area of use, the method comprising the steps of:

providing a recording medium supported by a substrate having substantially maximum diffraction efficiency containing a hologram formed pursuant to hologram forming exposure and development; and removing selected areas of the area of use, whereby the overall diffraction efficiency of the hologram layer comprising remaining areas thereof is determined by the percentage of remaining hologram containing areas relative to the total area of use which comprises the steps of:
  (i) applying a photoresist layer on the recording medium (11),
  (ii) exposing the photoresist layer with an illumination pattern such that the photoresist layer will be removed from the areas of the recording medium (11) selected to be removed.
  (iii) developing the photoresist layer to remove areas of said photoresist layer selected to be removed, and
  (iv) etching uncovered areas of the recording medium to remove selected recording medium areas,
  (v) removing any remaining photoresist.

2. A method for exposing hologram recording material having a predetermined area of use to achieve a predetermined net overall diffraction efficiency for said predetermined area, the method of removing selected areas of the area of use of the hologram recording material, whereby the remaining areas of use are hologram forming areas, comprising the steps of:
  (i) applying a photoresist layer on the recording medium,
  (ii) exposing the photoresist layer with an illumination pattern such that the photoresist layer will be removed from the areas of the recording medium selected to be removed,
  (iii) processing the photoresist layer to remove areas of said photoresist layer selected to be removed,
  (iv) etching uncovered areas of the recording medium to remove selected recording medium areas; and
  (v) removing any remaining photoresist
  (vi) exposing the hologram recording medium to holograph forming imaging illumination at a predetermined exposure level that provides a predetermined local diffraction efficiency in hologram forming areas, which exposure level will provide substantially maximum diffraction efficiency for the hologram forming areas.

3. A method for controlling the diffraction efficiency of a hologram layer having a predetermined area of use to achieve a net overall diffraction efficiency that varies with position over the predetermined area of use, the method comprising:
  providing a hologram layer containing a hologram form pursuant to hologram forming exposure with an exposure level that will provide substantially maximum diffraction efficiency for the hologram forming areas; and
  removing selected areas of use of the hologram layer whereby the remaining areas of the area of use are hologram containing areas and whereby the percentage of the hologram containing areas relative to the total area of sue is selectively varied with position over the area of use, which comprise the steps of:
  (i) applying a photoresist layer on to recording medium,
  (ii) exposing the photoresist layer with an illumination pattern such that the photoresist layer will be removed from the areas of the recording medium selected to be removed,
  (iii) processing the photoresist layer to remove areas of said photoresist layer selected to be removed, and
  (iv) etching uncovered areas of the recording medium to remove selected recording medium areas,
  (v) removing any remaining photoresist.

4. A method for exposing hologram recording material having a predetermined area of use to achieve a net overall diffraction efficiency that varies with position over said predetermined area, the method comprising:
  removing selected areas of the area of use, whereby the remaining areas of the area of use are hologram forming areas and whereby the percentage of the hologram forming areas relative to the total area of use is selectively varied with position over the area of use so that net overall diffraction efficiency varies with position over the area of use, which comprises the steps of:
  (i) applying a photoresist layer on the recording medium,
  (ii) exposing the photoresist layer with an illumination pattern such that the photoresist layer will be removed from the areas of the recording medium selected to be removed,
  (iii) processing the photoresist layer to remove areas of said photoresist layer selected to be removed, and
  (iv) etching uncovered areas of the recording medium to remove the selected recording medium areas,
  (v) removing any remaining photoresist, and
  (vi) exposing the hologram recording medium to holograph forming imaging illumination at a predetermined exposure level that provides a predetermined local diffraction efficiency in hologram forming areas, which exposure level will provide substantially maximum diffraction efficiency for the hologram forming areas.

* * * * *